US008152346B2

(12) United States Patent
Yatsuda

(10) Patent No.: US 8,152,346 B2
(45) Date of Patent: Apr. 10, 2012

(54) VEHICLE LIGHTING UNIT AND VEHICLE LIGHT

(75) Inventor: Yasushi Yatsuda, Tokyo (JP)

(73) Assignee: Stanley Electric Co., Ltd., Tokyo (JP)

(*) Notice: Subject to any disclaimer, the term of this patent is extended or adjusted under 35 U.S.C. 154(b) by 201 days.

(21) Appl. No.: 12/544,362

(22) Filed: Aug. 20, 2009

(65) Prior Publication Data

US 2010/0046243 A1 Feb. 25, 2010

(30) Foreign Application Priority Data

Aug. 20, 2008 (JP) ................................ 2008-211980

(51) Int. Cl.
*B60Q 1/00* (2006.01)
*B60Q 3/00* (2006.01)

(52) U.S. Cl. ........ 362/538; 362/507; 362/518; 362/522; 362/545

(58) Field of Classification Search .................. 362/507, 362/516–518, 520–522, 538, 543–545
See application file for complete search history.

(56) References Cited

U.S. PATENT DOCUMENTS 7,883,250 B2 * 2/2011 Nishihata ..................... 362/516
2003/0198060 A1 10/2003 Ishida et al.

FOREIGN PATENT DOCUMENTS

JP 2003-317513 A 11/2003

* cited by examiner

*Primary Examiner* — Jason Moon Han
(74) *Attorney, Agent, or Firm* — Kenealy Vaidya LLP

(57) ABSTRACT

A vehicle lighting unit can include a first reflector surface and a second reflector surface disposed vertically with the optical axis of an LED light source interposed therebetween. The first reflecting surface and the second reflecting surface can form respective light distribution patterns. The first reflecting surface can include an edge near the projection lens formed in a substantially elliptic shape and designed so as to take an aberration of the projection lens into consideration. The edge can be disposed so as to coincide with a focus group of the projection lens. The second reflecting surface can be formed to have a substantially conical curved surface or a curved surface having at least a part of a cross section of a substantially conical curved surface. Direct light emitted from the LED light source and passing through/between the first reflecting surface and the second reflecting surface can form a light distribution pattern.

26 Claims, 9 Drawing Sheets

VEHICLE LIGHTING UNIT AND VEHICLE LIGHT

This application claims the priority benefit under 35 U.S.C. §119 of Japanese Patent Application No. 2008-211980 filed on Aug. 20, 2008, which is hereby incorporated in its entirety by reference.

TECHNICAL FIELD

The presently disclosed subject matter relates to a vehicle lighting unit and a vehicle light, and in particular, to a vehicle lighting unit using an LED light source and a vehicle light including the vehicle lighting unit.

BACKGROUND ART

Conventionally known vehicle lights, in particular, vehicle headlights can form a desired light distribution pattern by superposing, on a basic light distribution pattern, at least one additional light distribution pattern using at least two reflecting surfaces (see, for example, Japanese Patent Application Laid-Open No. 2003-317513). An exemplary vehicle headlight of this type can have an LED light source, a first reflecting surface for reflecting light from the LED light source to form a basic light distribution pattern, and a second reflecting surface for reflecting a part of light reflected from the first reflecting surface to form an additional light distribution pattern.

A united component for use in a conventional vehicle headlight is shown in FIG. 1. Hereinafter, the united component shall be referred to as a "vehicle lighting unit," a "vehicle headlight unit" or simply a "unit." The unit 1000 includes a projection lens 100, an LED light source 120 having an optical axis, a first reflecting surface 130 disposed along the optical axis of the light source in front of the LED light source 120 so as to cover the LED light source 120, a shade 140 horizontally disposed between the projection lens 100 and the LED light source 120, a second reflecting surface 150 formed on or above the upper surface of the shade 140, and the like.

In the vehicle headlight unit 1000 of FIG. 1, light emitted from the LED light source 120 is totally reflected by the first reflecting surface 130. Part of the reflected light is allowed to directly pass through the projection lens 100 to form the basic light distribution pattern. Another part of the reflected light is allowed to be reflected by the second reflecting surface 150 and pass through the projection lens 100 to form the additional light distribution pattern to be superposed on the basic light distribution pattern.

In general, a light distribution pattern formed by a vehicle headlight is configured to include a region provided with the highest intensity of light in the vicinity of a light/dark border closer to pedestrians and another region provided with a relatively low intensity of light closer to an opposed vehicle in view of the reflection from a wetted road surface.

SUMMARY

In the vehicle headlight unit 1000 of FIG. 1, the light emitted from the LED light source 120 including direct light is totally reflected by the first reflecting surface 130 in order to form a desired light distribution pattern. In order to capture all the light from the light source 120, the dimension of the first reflecting surface 130 in the optical axis Ax direction of the vehicle headlight unit cannot be decreased. In other words, a vehicle headlight unit thin in the depth direction cannot be obtained due to the required dimension of the reflecting surface.

If the vehicle headlight unit 1000 having such a configuration is thinned in the depth direction by decreasing the dimension of the first reflecting surface 130 in the optical axis Ax direction, the first reflecting surface 130 may not cover the entire region where the light from the LED light source 120 reaches. This means part of light not covered by the first reflecting surface 130 is directly emitted outward. Accordingly, the light utilization efficiency of the LED light source 120 deteriorates, resulting in a decreased intensity of the light distribution pattern. Also the far visibility by the light distribution deteriorates due to this, and no clear light/dark border (or so-called "cut-off line" can be formed in the light distribution pattern.

The presently disclosed subject matter was devised in view of these and other characteristics, features and problems and in association with the conventional art. According to an aspect of the presently disclosed subject matter, a vehicle lighting unit can maintain the high light utilization efficiency of an LED light source while achieving a thin profile in the depth direction. Also provided is a vehicle light including the vehicle lighting unit.

According to another aspect of the presently disclosed subject matter, a vehicle lighting unit having an optical axis can include: an LED light source having a light emitting portion and an optical axis substantially parallel with the optical axis of the vehicle lighting unit; a projection lens disposed forward in a direction of the optical axis of the LED light source and having an optical axis substantially parallel with the optical axis of the LED light source; and an optical member disposed between the LED light source and the projection lens, the optical member being configured so as to transmit light received from the LED light source toward the projection lens to allow the light to pass through the projection lens and to form a predetermined light distribution pattern having a cut-off line. The optical member can include a first reflecting surface horizontally disposed below the optical axis of the LED light source and substantially on the optical axis of the vehicle lighting unit, and a second reflecting surface disposed above the optical axis and facing to the first reflecting surface. In this configuration, the first reflecting surface can include an edge formed in an substantially elliptic shape and arranged in an horizontal plane and designed so as to take an aberration of the projection lens into consideration. The first reflecting surface can extend from the edge to a location near a light emitting portion of the LED light source. The second reflecting surface can have a focus disposed on or adjacent to the LED light source, and can be formed to have a substantially conical curved surface or a curved surface having at least a part of a cross section of a substantially conical curved surface.

According to the presently disclosed subject matter, part of the light from the LED light source can be reflected by the first reflecting surface so as to form the first light distribution pattern portion. Another part of the light from the LED light source can be reflected by the second reflecting surface so as to form the second light distribution pattern, and in some cases, form the first light distribution pattern portion. The light emitted from the LED light source (light emitted in the optical axis direction of the LED light source) is allowed to directly enter the projection lens without reflection (referred to as "direct light"). Then, this light can pass through the projection lens and be emitted therefrom to form the first light distribution pattern portion.

The vehicle lighting unit configured as described above uses the direct light of the LED light source with high brightness for forming a light distribution pattern. Accordingly, the first reflecting surface and the second reflecting surface can be formed to be relatively short in the depth dimension in the optical axis direction, and for example, short enough for the reflecting surfaces to reflect light from the LED light source while the light utilization efficiency of the LED light source can be maintained high. Furthermore, the length of the first reflecting surface and that of the second reflecting surface can be made shorter in the optical axis direction than the reflecting surface of the conventional vehicle lighting unit since the vehicle lighting unit of the presently disclosed subject matter uses the direct light of the LED light source with high brightness for forming a light distribution pattern. This configuration can allow the profile of the entire vehicle lighting unit in the depth direction to be thinner.

In the presently disclosed subject matter, the edge of the first reflecting surface can be formed in a substantially elliptic shape along the focus group of the projection lens. Accordingly, even when the projection lens is formed of an aspheric lens, the edge of the first reflecting surface can be formed so as to take the aberration of the aspheric projection lens into consideration. In addition to this, the first reflecting surface can be disposed such that the edge thereof is matched with the focus group of the projection lens in position. Accordingly, even when the vehicle lighting unit is configured to diffuse the emission light broadly, a clear cut-off line in the light distribution pattern that may be required for a vehicle headlight can be formed.

In the claims, the phrase "substantially parallel" in the phrase "an LED light source having a light emitting portion and an optical axis substantially parallel with the optical axis of the unit" shall be defined herein to include the case where both the axes are co-axial with each other, and the case where both the axes are parallel with each other in the vertical direction. In the claims, the phrase "substantially on the optical axis" in the phrase "a first reflecting surface disposed below the optical axis of the LED light source horizontally and substantially on the optical axis of the vehicle lighting unit" shall be defined herein to include the case where the first reflection surface is disposed on the optical axis of the LED light source and the case where the first reflecting surface is disposed slightly below the optical axis thereof.

According to the presently disclosed subject matter, the optical member can further include a third reflecting surface that is opposite to the first reflecting surface with the optical axis of the LED light source being interposed therebetween and substantially parallel with the optical axis of the LED light source. The third reflecting surface can cover the area where light that is obliquely and upwardly emitted from the LED light source is projected, the light having conventionally been wasted. Accordingly, the light can be utilized for forming the second light distribution pattern portion, thereby improving the light utilization efficiency.

According to the presently disclosed subject matter, the first reflecting surface and the second reflecting surface of the optical member can surround and define a space, and the space can be filled with a resin.

According to the presently disclosed subject matter, the first reflecting surface and the second reflecting surface of the optical member can be entirely or partly subjected to a reflection surface treatment.

According to the presently disclosed subject matter, the first reflecting surface, the second reflecting surface and the third reflecting surface of the optical member can surround and define a space, and the space can be filled with a resin.

According to the presently disclosed subject matter, the first reflecting surface, the second reflecting surface, and the third reflecting surface of the optical member can be entirely or partly subjected to a reflection surface treatment.

According to the presently disclosed subject matter, the distance between the edge of the first reflecting surface of the optical member and the light emitting portion of the LED light source can be 10 mm or less and greater than 0 mm.

According to the presently disclosed subject matter, the optical member can include a hollow portion around the optical axis of the LED light source so that the hollow portion penetrates the optical member and the light emitted from the LED light source along its optical axis can pass through the hollow portion and directly enter the projection lens. In this configuration, the first reflecting surface can be disposed below the hollow portion.

Alternatively, according to the presently disclosed subject matter, the optical member can include a light entering surface that receives light from the LED light source. The light entering surface can be formed in a convex shape toward the LED light source.

According to the presently disclosed subject matter, the light emitting portion of the LED light source can have a lower side that is disposed such that the first reflecting surface can prevent light from the light emitting portion from entering below the first reflection surface.

According to the presently disclosed subject matter, the vehicle lighting unit can project light to form a predetermined light distribution pattern including a cut-off line. The first reflecting surface of the optical member can partly include a surface inclined by 15 to 45 degrees with respect to a horizontal width direction for forming the cut-off line near the optical axis.

The vehicle lighting unit according to the presently disclosed subject matter can be applied to vehicle headlights including main headlights, auxiliary headlights, and the like.

According to the presently disclosed subject matter, a vehicle light can be composed of a housing and a vehicle lighting unit portion including at least one vehicle lighting unit according to any of the foregoing modes. The vehicle light may be a vehicle headlight, for example.

As described above, a vehicle lighting unit and a vehicle light made in accordance with principles of to the presently disclosed subject matter can effectively utilize the direct light emitted from the LED light source in the optical axis direction with high brightness, for forming a light distribution pattern. Accordingly, even when the dimension of the first reflecting surface and the second reflecting surface in the optical axis direction is shortened enough for them to reflect the light from the LED light source, the vehicle lighting unit can maintain the light utilization efficiency high. Furthermore, the profile of the vehicle lighting unit in the depth direction can be thinned.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A description will now be made below with respect to certain exemplary embodiments of a vehicle lighting unit of and vehicle light made in accordance with principles of the presently disclosed subject matter and with reference to the accompanying drawings. Hereinafter, the exemplary embodiments of the vehicle lighting unit will be described as a vehicle headlight unit.

Figure 1:
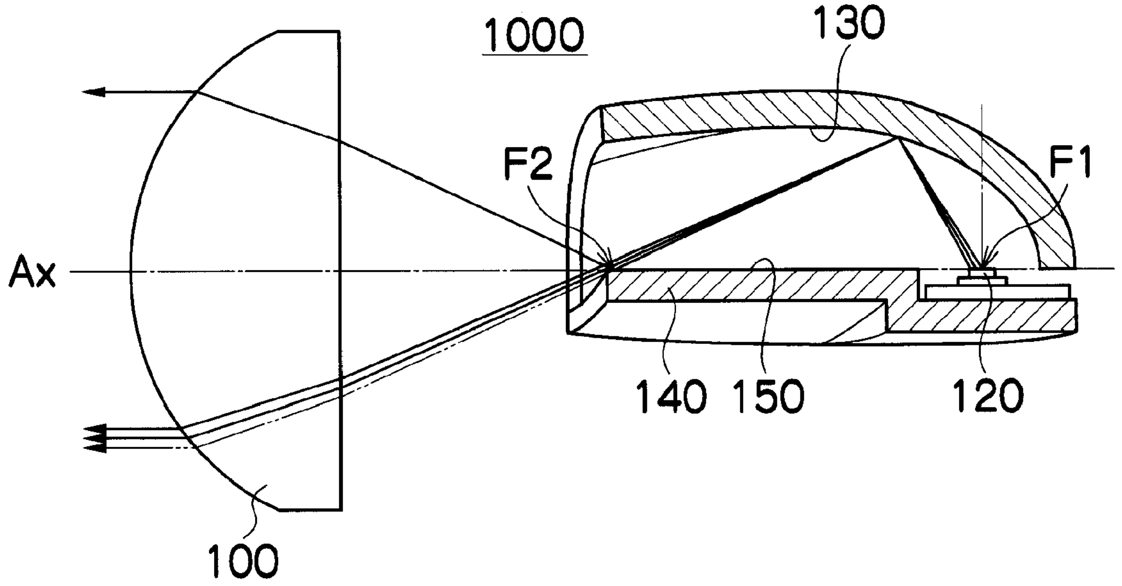
Fig. 1 Conventional Art
FIG. 1 is a longitudinal cross section illustrating one example of a conventional vehicle headlight unit.
Figure 2:
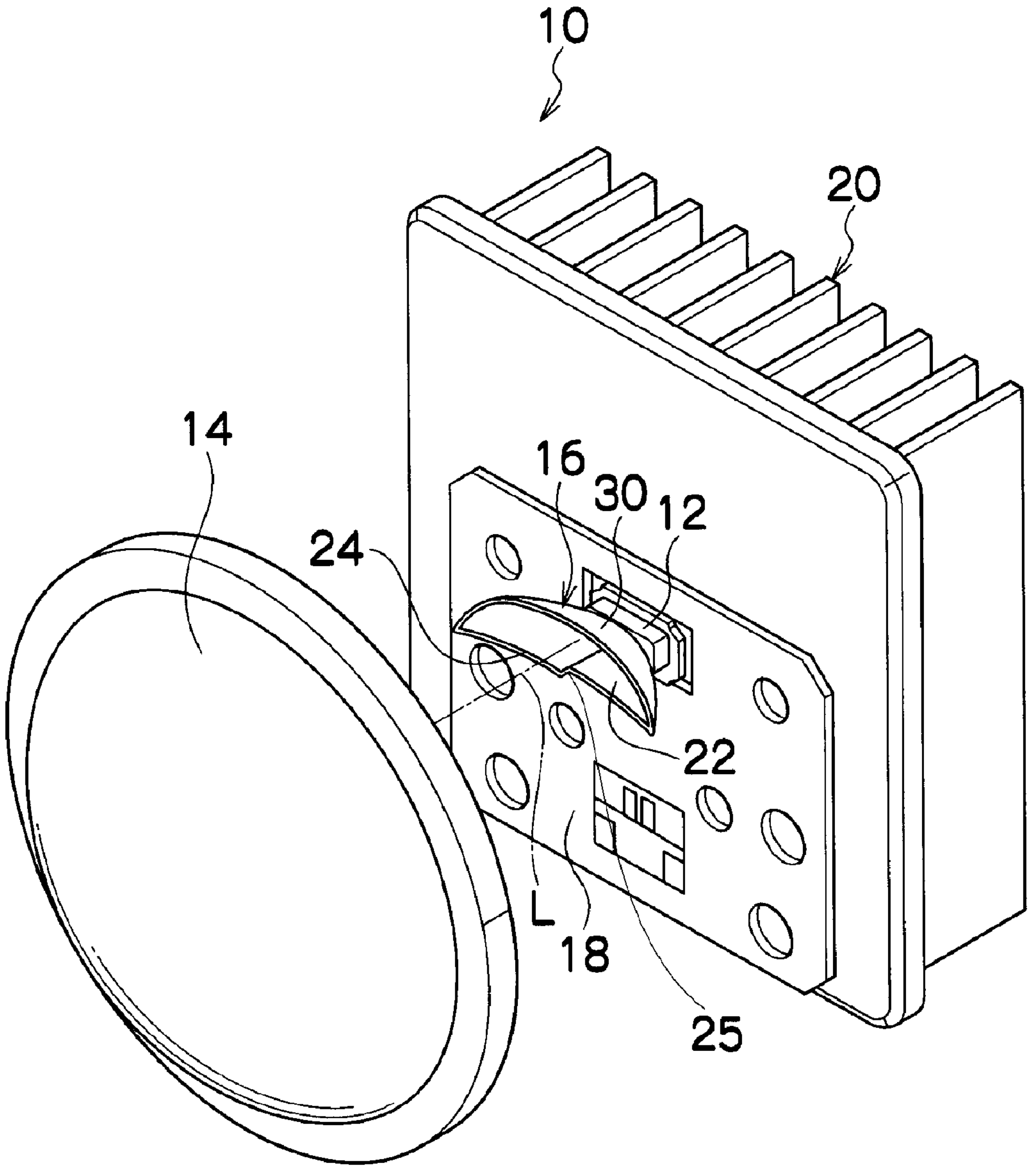
FIG. 2 is a perspective view illustrating a vehicle headlight unit of a first exemplary embodiment made in accordance with principles of the presently disclosed subject matter.
Figure 3:
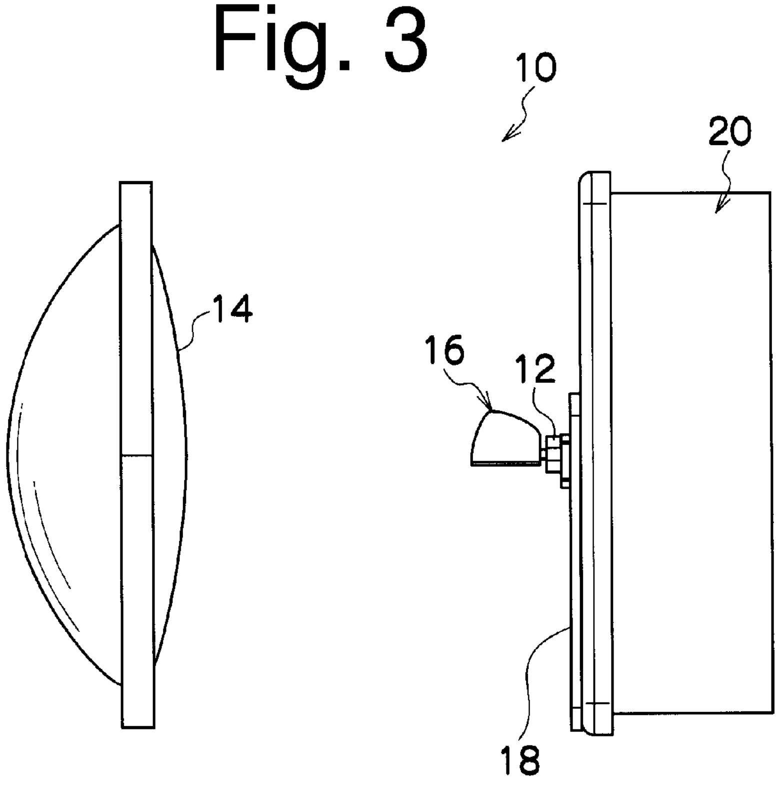
FIG. 3 is a side view illustrating the vehicle headlight unit of FIG. 2.

FIG. 2 is a perspective view illustrating a vehicle headlight unit 10 of a first exemplary embodiment, and FIG. 3 is a side view of the vehicle headlight unit 10.

The vehicle headlight unit 10 can include an LED light source 12, a projection lens 14, and an optical member 16 disposed between the LED light source 12 and the projection lens 14.

Figure 4:
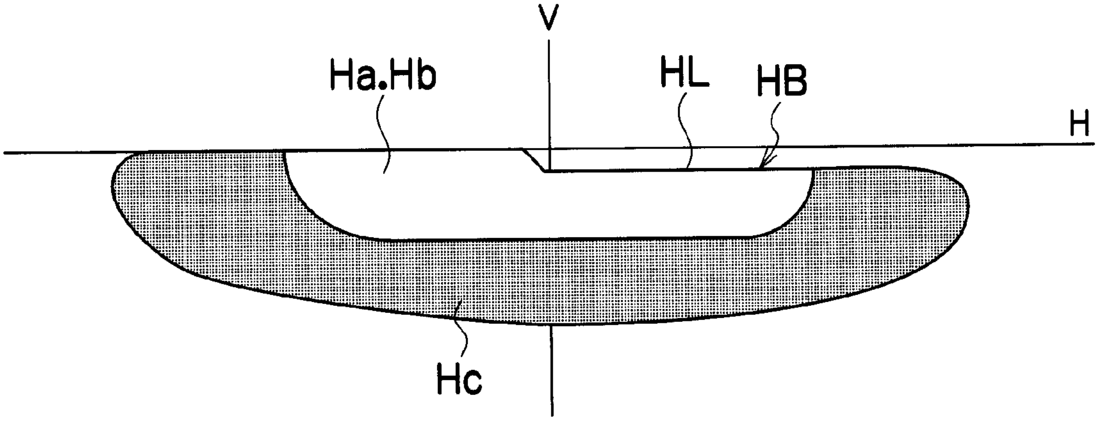
FIG. 4 shows a light distribution pattern formed by the vehicle headlight unit of FIG. 2.
Figure 5:
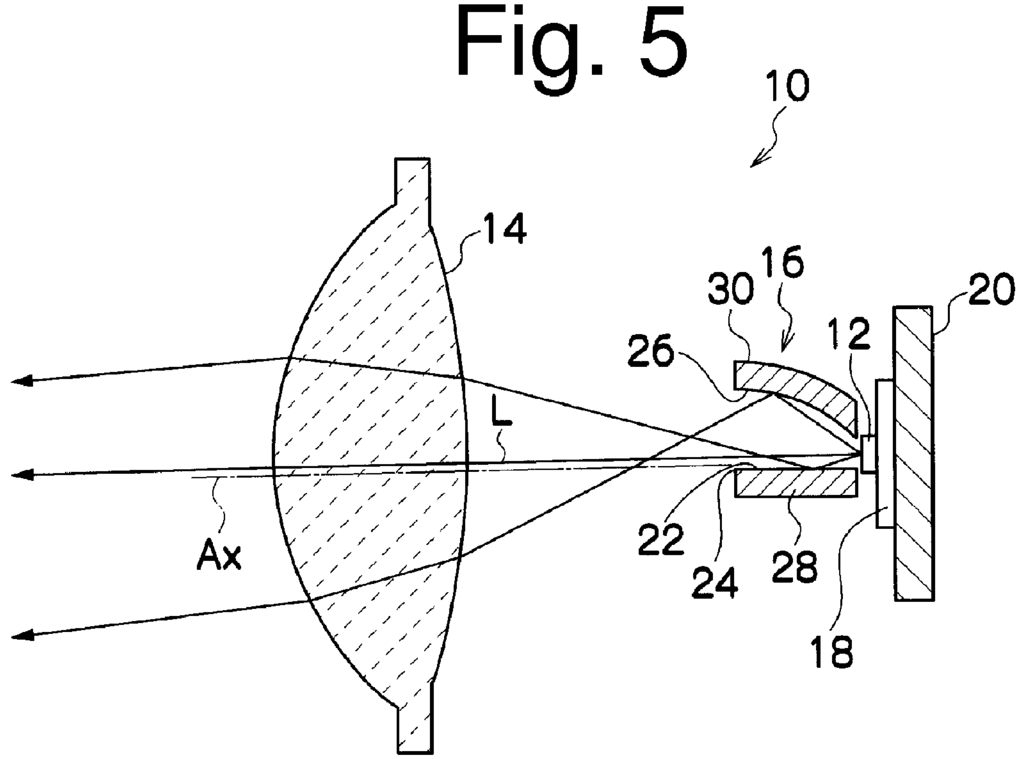
FIG. 5 is a longitudinal cross section illustrating the vehicle headlight unit of FIG. 2.

The LED light source 12 has an optical axis L which substantially coincides with the optical axis Ax of the vehicle headlight unit 10 (see FIG. 5). The LED light source 12 can include an LED chip (or LED chips) (not illustrated) that can emit light configured to pass through the projection lens 14 via the optical member 16. The vehicle headlight unit according to the presently disclosed subject matter as configured above can form a light distribution pattern HB including a cut-off line HL as shown in FIG. 4. It should be noted that the LED light source 12 can include an LED chip or LED chips emitting white light suitable for a vehicle headlight. However, the presently disclosed subject matter is not limited to this embodiment. For example, when the vehicle lighting unit according to the presently disclosed subject matter is applied to an auxiliary headlight (for example, fog lamp), light of another color can be emitted suitable for the particular purpose.

The LED light source 12 is installed on a substrate 18 to which a heat sink 20 is attached as shown in FIG. 2. This heat sink 20 can dissipate heat from the LED light source 12.

The projection lens 14 of the present exemplary embodiment can include an aspheric lens which can broadly diffuse light from the LED light source 12. The presently disclosed subject matter is not limited to an aspheric lens, and a spherical lens or other lens can be employed. Examples of the material for forming the projection lens 14 include, but are not limited to, glass, a heat resistant resin, and other suitable materials.

FIG. 4 is an explanatory view illustrating the light distribution pattern HB. The light distribution pattern HB is one example for use as a low-beam distribution pattern in the case of left-hand traffic. The low-beam distribution pattern HB can include a right half area divided by the center line (line V in the drawing) where an upward light component is not included in order to prevent glare for a driver of an opposed vehicle. Furthermore, the low-beam distribution pattern HB can include a left half area including upward light components emitted towards a left side and upward by substantially 15 degrees in order for a driver to facilitate the recognition of traffic signs provided along a roadside (so-called "elbow area"). It should be noted that the upward angle is not limited to 15 degrees, but may also be between 15 degrees and 45 degrees, for example.

By the configuration of the present exemplary embodiment, the shape projected by the edge 24 of the first reflecting surface 22 of the optical member 16 as shown in FIG. 5 (to be described in more detail later) can be magnified to project the similar shape for forming the cut-off line HL of the low-beam light distribution pattern HB. Furthermore, direct light from the LED light source 12 can be projected by the projection lens 14 as it is. Diffused light that is downwardly emitted from the LED light source 12 is allowed to be reflected by the first reflecting surface 22 and projected by the projection lens 14. Diffused light that is upwardly emitted from the LED light source 12 is allowed to be reflected by the second reflecting surface 26 and projected by the projection lens 14. These beams of projected light can form the low-beam distribution pattern HB.

Specifically, the low-beam distribution pattern HB can include a light distribution pattern Ha formed by the direct light emitted from the LED light source 12 and a light distribution pattern Hb formed by the light reflected by the first reflecting surface 22. These distribution patterns can be superposed with each other around the optical axis Ax of the vehicle headlight unit 10. In addition, a light distribution pattern Hc formed by the light reflected by the second reflecting surface 26 can be arranged over and around the light distribution patterns Ha and Hb. Accordingly, in this example the light distribution patterns Ha and Hb are the brightest, and are disposed at the center area of the low-beam distribution pattern HB. This configuration can achieve brightest illumination of the front area of the vehicle to thereby improve distance visibility.

It should be noted that when the light is projected by the projection lens 14, the projected shape is turned vertically and horizontally. Accordingly, the LED chip(s) contained in the LED light source 12 is appropriately disposed so that the turned projected light can provide the low-beam distribution pattern HB with a proper erecting image of the light emitted from the LED chip(s). It should also be noted that the shape of the edge 24 of the first reflecting surface 22 can appropriately form various light distribution patterns with or without an elbow area or a high-beam light distribution pattern. The first reflecting surface 22 and the second reflecting surface 26 can be characterized as each having a longitudinal axis that extends substantially parallel to each other and in a widthwise direction normal to the optical axis of the vehicle headlight unit 10. In this embodiment, the second reflecting surface 26 is formed as a concave surface facing the first reflecting surface 22, which can be substantially planar as compared to the second reflecting surface 26.

Figure 6:
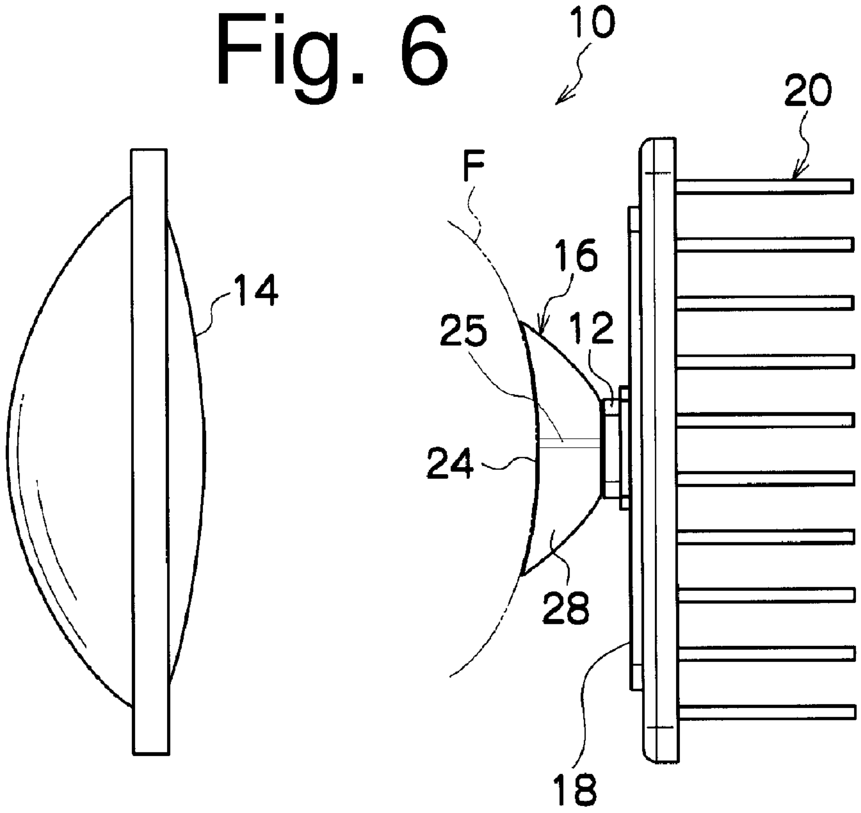
FIG. 6 is a bottom view illustrating the vehicle headlight unit of FIG. 2.

FIG. 6 is a bottom view of the headlight unit of the present exemplary embodiment wherein the projection lens 14 can be designed to have a focus group F having an elliptic shape. In order to accurately provide the light distribution pattern, the edge 24 of the first reflecting surface 22 can be disposed on or adjacent to the focus group F of the projection lens 14. In addition to this, the edge 24 of the first reflecting surface 22 can have a substantially elliptic shape corresponding to the shape of the focus group F of the projection lens 14. This means that the edge 24 of the first reflecting surface 24 is designed by taking the aberration of the aspheric projection lens 14 into consideration. In order to effectively utilize the designed shapes, the projection lens 14, the optical member 16, and the LED light source 12 are relatively disposed so that the edge 24 is disposed on or near the focus group F of the projection lens 14. This configuration can form a clear cut-off line HL which is typically desired by commonly used vehicle headlights even though the vehicle headlight unit 10 may emit broadly diffused light. The first reflecting surface 22 can extend from the edge 24 of the substantially elliptic shape to near the light emitting portion of the LED light source 12 in the optical axis Ax direction of the vehicle headlight unit 10.

A description will be given of the optical member 16.

The optical member 16 can include a first reflector plate 28 and a second reflector plate 30 which are opposite to each other and horizontally arranged with the optical axis L of the LED light source 12 interposed therebetween as shown in FIG. 5. A first reflecting surface 22 can be formed on an inner face of the first reflector plate 28 so as to be disposed on or near the optical axis Ax of the vehicle headlight unit 10. A second reflecting surface 26 can be formed on an inner face of the second reflector plate 30. The first reflecting surface 22 of the optical member 16 can be partly formed of an inclined surface 25 by 15 to 45 degrees, for example, with respect to the horizontal width direction for forming the cut-off line near the optical axis as shown in FIG. 2.

The first reflector plate 28 can have an edge 24 near the projection lens 14 and the edge 24 can be formed in an elliptic shape similar to the focus group F of the projection lens 14. Thus, the first reflector plate 28 can be disposed such that the edge 24 is aligned along the position of the focus group F. The second reflector plate 30 can include a substantially conical curved surface or a curved surface having a cross section of a substantially conical curved surface and have a focus located at or adjacent to the LED light source 12. The direct light emitted from the LED light source 12 and which passes through the first reflecting surface 22 and the second reflecting surface 26 can be projected onto the light distribution patterns Ha and Hb.

Accordingly, a vehicle headlight unit 10 configured as described above can form the light distribution pattern Hb by the light emitted from the LED light source 12 and reflected by the first reflecting surface 22. In addition to this, the unit 10 can form the light distribution pattern Hc by the light emitted from the LED light source 12 and reflected by the second reflecting surface 26. The direct light emitted from the LED light source 12 is allowed to pass through the projection lens 14 without reflection to form the light distribution pattern Ha.

In the vehicle lighting unit 10 configured as described above, the first reflecting surface 22 and the second reflecting surface 26 can be formed to be relatively short in the depth dimension direction parallel with the optical axis direction but large enough for the reflecting surfaces to reflect light from the LED light source. This configuration can allow the profile of the entire vehicle lighting unit in the depth direction to be thinner. Although these reflecting surfaces are not designed to reflect all of the light from the LED light source 12, the vehicle headlight unit, even when constructed with this configuration, can maintain a high utilization efficiency of the LED light source 12 since the direct light with high brightness from the LED light source 12 can be used to form the light distribution pattern Ha.

In FIG. 2, the first reflector plate 28 and the second reflector plate 30 are integrally formed to serve as an optical member 16. The presently disclosed subject matter is not limited to this exemplary embodiment, and the first reflector plate 28 and the second reflector plate 30 may be formed as separate members to form the optical member 16 as an integrated unit.

Figure 7:
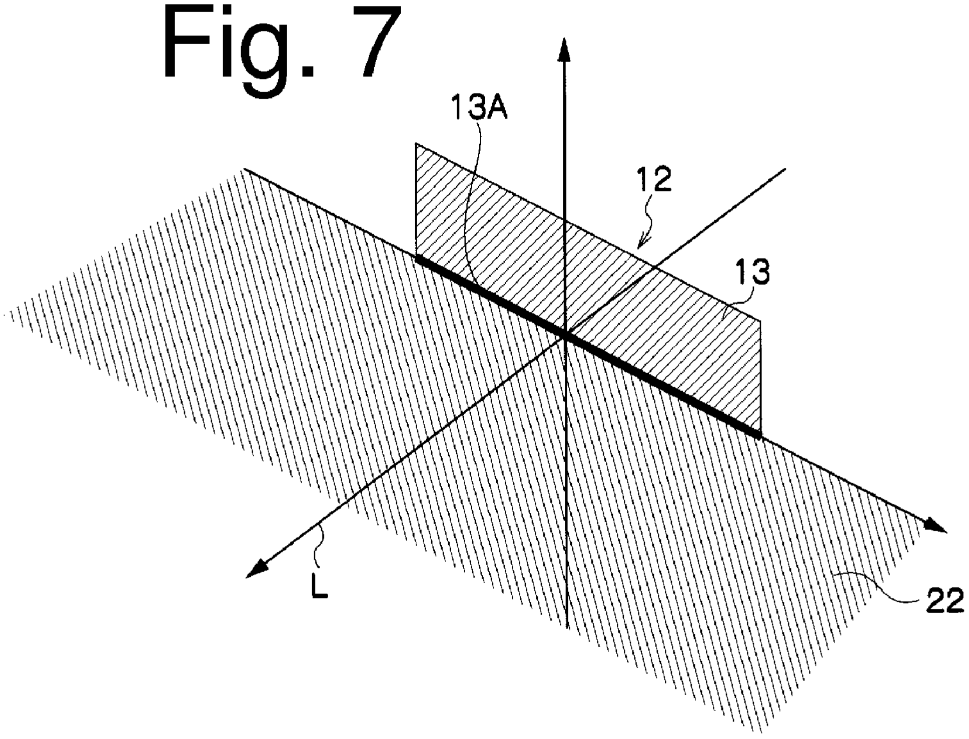
FIG. 7 is an explanatory diagram for describing the positional relationship between the light emitting portion of the LED light source and the first reflecting surface.

FIG. 7 shows the positional relationship between the light emitting portion 13 of the LED light source 12 and the first reflecting surface 22. As shown in FIG. 7, the light emitting portion 13 of the LED light source 12 has a lower side 13A on or above the first reflecting surface 22 so that the light emitted from the light emitting portion 13 can travel through the space above the first reflecting surface 22 (in other words, the first reflecting surface 22 can prevent the light from traveling below the optical member 16).

The distance between the edge 24 of the first reflecting surface 22 and the light emitting portion 13 of the LED light source 12 can be 10 mm or less and greater than 0 mm.

This configuration can ensure the achievement of a thinned depth profile for the vehicle headlight unit 10.

Figure 8:
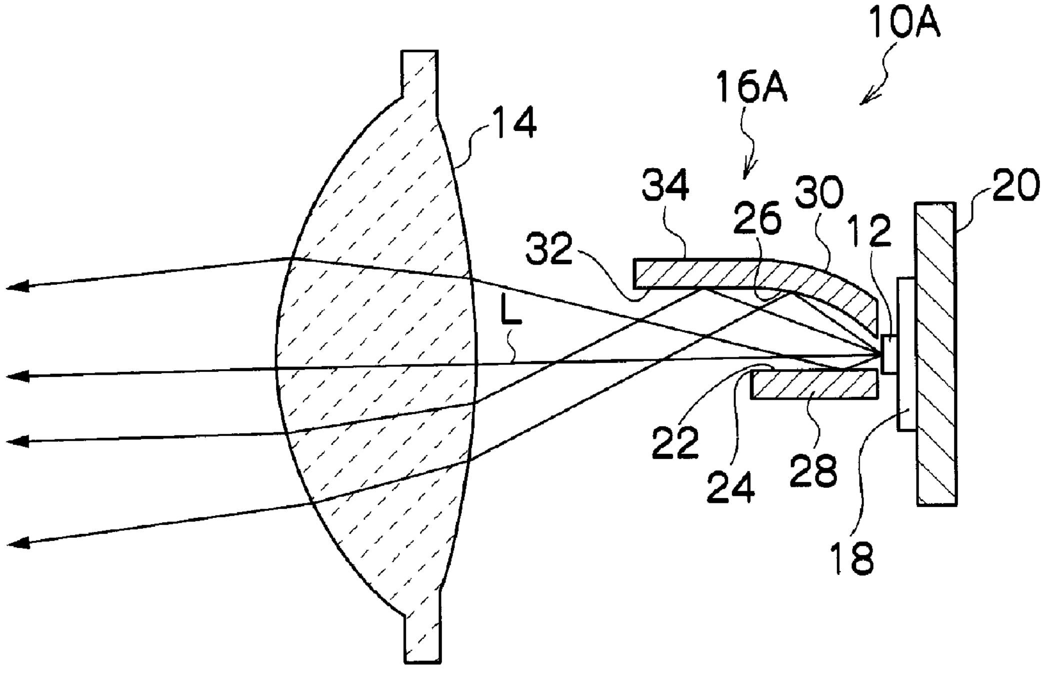
FIG. 8 is a longitudinal cross section illustrating a vehicle headlight unit of a second exemplary embodiment made in accordance with principles of the presently disclosed subject matter.

FIG. 8 is a longitudinal cross section illustrating the configuration of a vehicle headlight unit 10A of a second exemplary embodiment. In FIG. 8, the same or similar components of the second exemplary embodiment are denoted by the same reference numerals of those of the vehicle headlight unit 10 of the first exemplary embodiment shown in FIGS. 2 to 6.

The optical member 16A of the vehicle headlight unit 10A can include a first reflecting surface 22, a second reflecting surface 26, and a third reflecting surface 32. The third reflecting surface 32 can be disposed at a position vertically opposite to the first reflecting surface 22 with the optical axis L of the LED light source 12 interposed therebetween. The first reflecting surface 22 and the third reflecting surface 32 can be arranged substantially parallel with each other. The third reflecting surface 32 can be formed on an inner face of the third reflector plate 34 that can be integrally formed with the second reflector plate 30 so as to extend from the second reflector plate 30 toward the projection lens 14.

The provision of the third reflecting surface 32 as described above can effectively utilize the light that was wastefully diffused upward obliquely from the LED light source 12 to project the light toward the second light distribution pattern Hc (see FIG. 4). This means the light utilization efficiency can be improved. It should be appreciated that the second reflector plate 30 and the third reflector plate 34 may be formed as separate members.

Figure 9:
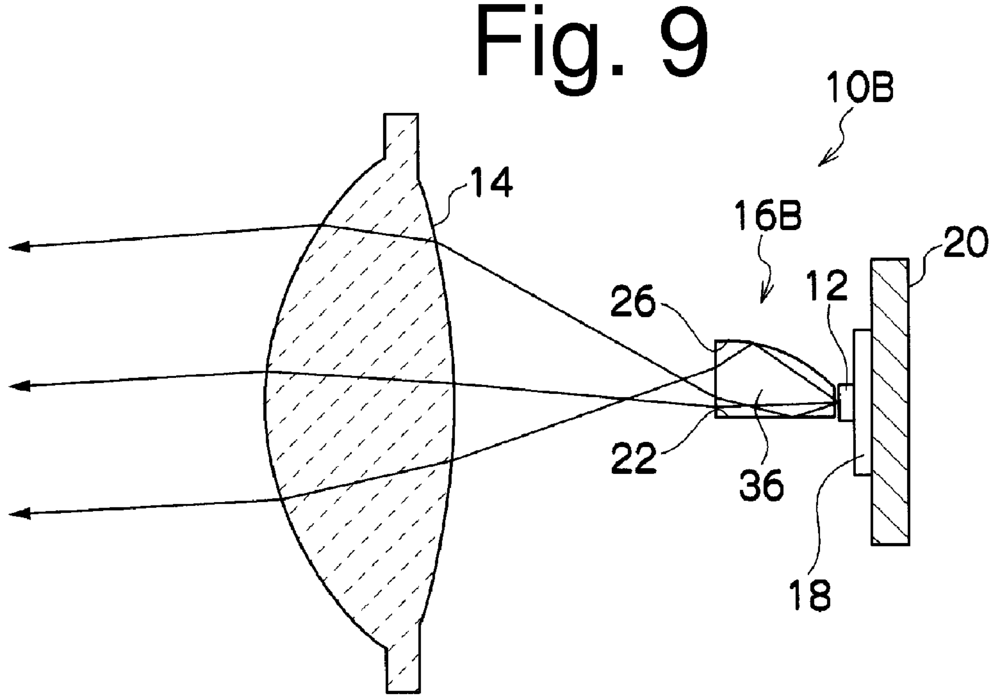
FIG. 9 is a longitudinal cross section illustrating a vehicle headlight unit of a third exemplary embodiment made in accordance with principles of the presently disclosed subject matter.

FIG. 9 is a longitudinal cross section illustrating the configuration of a vehicle headlight unit 10B of a third exemplary embodiment. In FIG. 9, the same or similar components of the third exemplary embodiment are denoted by the same reference numerals of those of the vehicle headlight unit 10 of the first exemplary embodiment shown in FIGS. 2 to 6.

The optical member 16B of the vehicle headlight unit 10B can be a light-guiding member formed by filling the space surrounded by the first reflecting surface 22 and the second reflecting surface 26 with a resin 36. In this configuration, part of or all of the first reflecting surface 22 and the second reflecting surface 26 are subjected to a reflection surface treatment such as aluminum or silver deposition. The optical member 16B configured like this can allow the direct light in the optical axis direction of the LED light source 12 to pass through the optical member 16B without reflection within the optical member 16B and enter the projection lens 14 as it is. Accordingly, the corresponding projected light can form a light distribution pattern with high brightness. The first reflecting surface 22 and the second reflecting surface 26 can be characterized as each having a longitudinal axis that extends substantially parallel to each other and in a widthwise direction normal to the optical axis of the vehicle headlight unit 10B. In this embodiment, the second reflecting surface 26 is formed as a convex surface facing away from the first reflecting surface 22, which can be substantially planar as compared to the convex second reflecting surface 26. Light can be reflected at the first reflecting surface 22 and second reflecting surface 26 of the optical member 10B via total internal reflection and/or with assistance from a reflective layer that is coated onto the surface of the optical member 10B.

Figure 10:
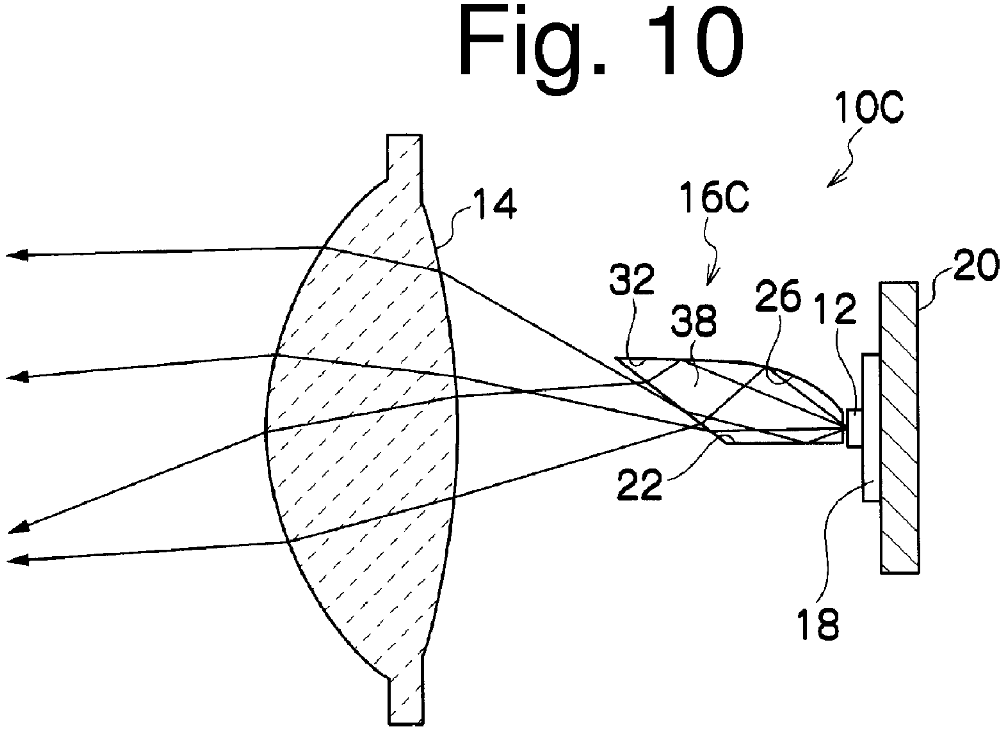
FIG. 10 is a longitudinal cross section illustrating a vehicle headlight unit of a fourth exemplary embodiment made in accordance with principles of the presently disclosed subject matter.

FIG. 10 is a longitudinal cross section illustrating the configuration of a vehicle headlight unit 10C of a fourth exemplary embodiment. In FIG. 10, the same or similar components of the fourth exemplary embodiment are denoted by the same reference numerals of those of the vehicle headlight unit 10A of the second exemplary embodiment shown in FIG. 8.

The optical member 16C of the vehicle headlight unit 10C can be a light-guiding member formed by filling the space surrounded by the first reflecting surface 22, the second reflecting surface 26, and the third reflecting surface 32 with a resin 38. In this configuration, part of or all of the first reflecting surface 22, the second reflecting surface 26, and the third reflecting surface 32 are subjected to a reflection surface treatment such as aluminum or silver deposition. The optical member 16C configured like this can allow the direct light in the optical axis direction of the LED light source 12 to pass through the optical member 16C without reflection within the optical member 16C and enter the projection lens 14 as it is. Accordingly, the corresponding projected light can form a light distribution pattern with high brightness.

Figure 11A:
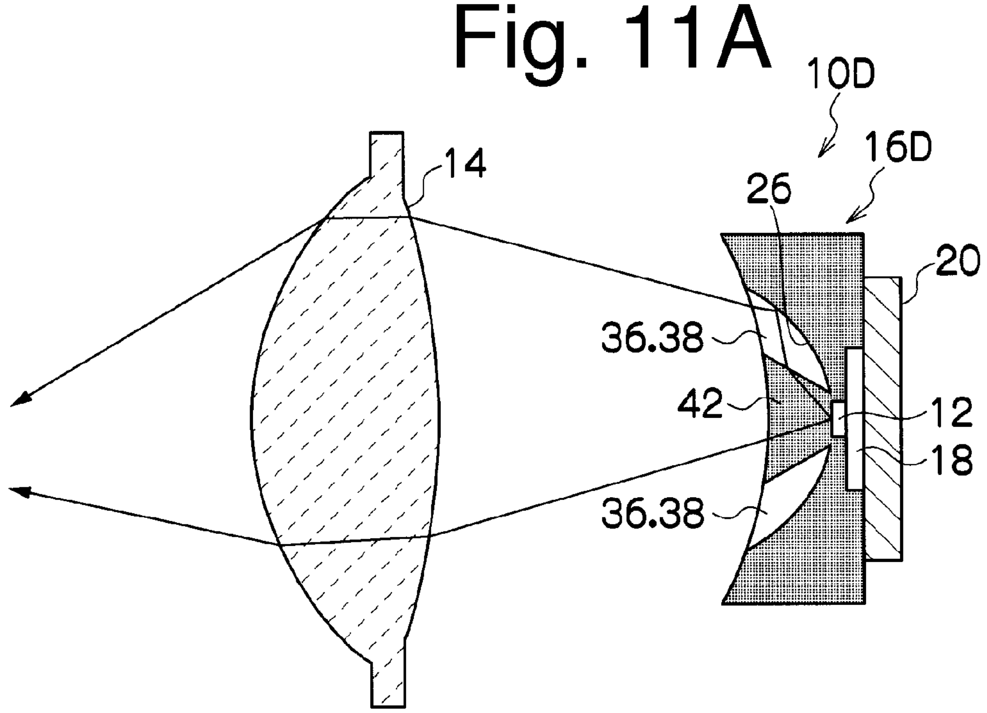
FIG. 11A is a horizontal cross section illustrating a vehicle headlight unit of a fifth exemplary embodiment made in accordance with principles of the presently disclosed subject matter.

FIG. 11A is a horizontal cross section illustrating the configuration of a vehicle headlight unit 10D of a fifth exemplary embodiment. In FIG. 11A, the same or similar components of the fifth exemplary embodiment are denoted by the same reference numerals of those of the vehicle headlight units 10B and 10C of the third and fourth exemplary embodiments shown in FIGS. 9 and 10.

Figure 11B:
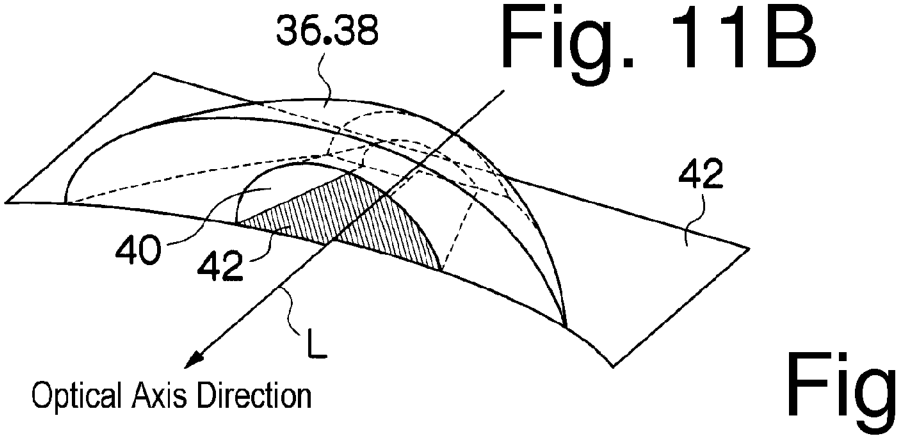
FIG. 11B is a perspective view of the optical member shown in FIG. 11A, when viewed from the projection lens side.
Figure 11C:
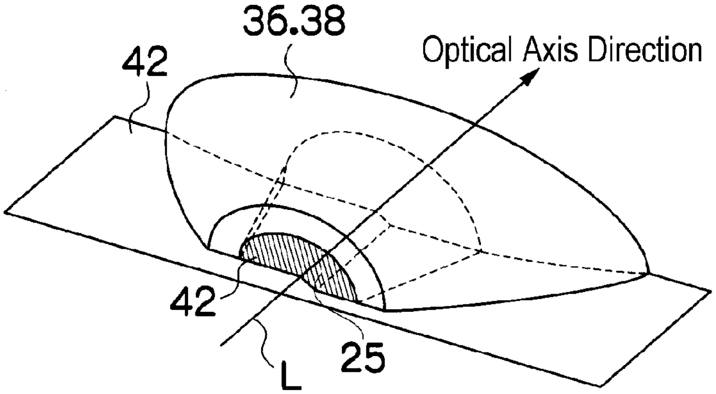
FIG. 11C is a perspective view of the optical member shown in FIG. 11A, when viewed from the LED light source side.

The optical member 16D of the vehicle headlight unit 10D can be a light-guiding member formed of a resin and include a hollow portion 40 near the optical axis L of the LED light source 12 as shown in FIGS. 11B and 11C. A reflector plate 42 having a reflector portion with the same shape as the first reflector plate 28 (see FIG. 5) can be disposed just below the hollow portion 40 horizontally to serve as the first reflecting surface. The optical member 16D configured like this can allow the direct light in the optical axis L direction of the LED light source 12 to pass through the hollow portion without reflection within the optical member 16D and enter the projection lens 14 as it is. Accordingly, the corresponding projected light can form a light distribution pattern with high brightness.

Figure 12A:
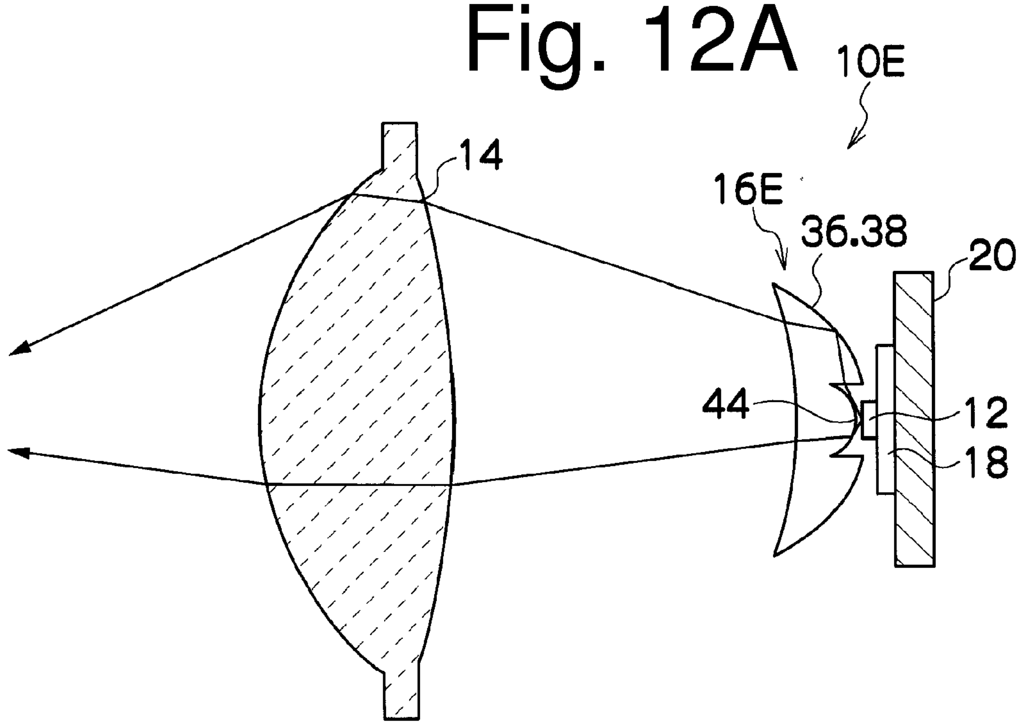
FIG. 12A is a horizontal cross section illustrating a vehicle headlight unit of a sixth exemplary embodiment made in accordance with principles of the presently disclosed subject matter.
Figure 12B:
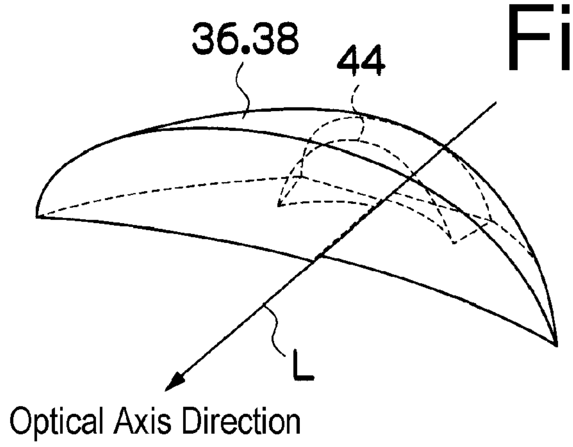
FIG. 12B is a perspective view of the optical member shown in FIG. 12A, when viewed from the projection lens side.

FIG. 12A is a horizontal cross section illustrating the configuration of a vehicle headlight unit 10E of a sixth exemplary embodiment. In FIG. 12A, the same or similar components of the sixth exemplary embodiment are denoted by the same reference numerals of those of the vehicle headlight units 10B and 10C of the third and fourth exemplary embodiments shown in FIGS. 9 and 10.

The optical member 16E of the vehicle headlight unit 10E can have a light entering surface 44 that faces towards the light emission portion of the LED light source 12 and receives light emitted from the LED light source 12. The light entering surface 44 can be formed in a convex shape facing toward the LED light source. Accordingly, the light entering surface 44 can function as a convex lens. A reflector plate 46 can be disposed on a horizontal plane with respect to the optical member 16E and headlight unit as shown in FIG. 12C.

In this configuration, the direct light in the optical axis of the LED light source 12 can be gathered by the light entering surface 44 having a convex lens function and the gathered light can be projected toward the projection lens 14. Accordingly, the gathered light can increase the brightness of the first light distribution patterns Ha and Hb of the light distribution pattern HB as shown in FIG. 4. This can also improve distance visibility. It should be noted that the curvature of the light entering surface 44 can be controlled to adjust the sizes of the first light distribution patterns Ha and Hb and brightness thereof.

Figure 12C:
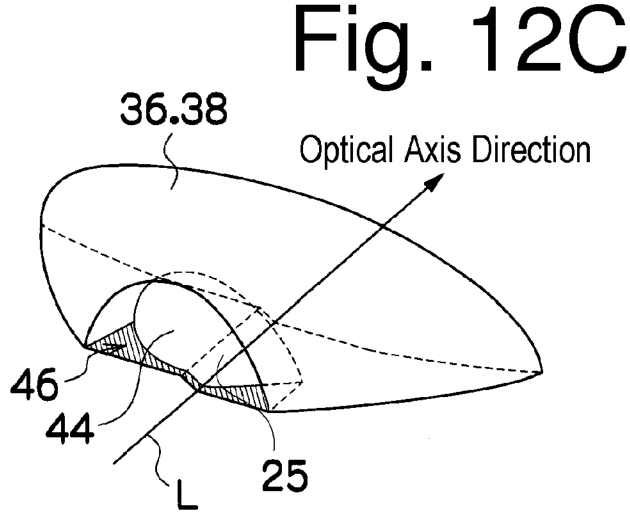
FIG. 12C is a perspective view of the optical member shown in FIG. 12A, when viewed from the LED light source side.

The diffused light from the LED light source 12 can be reflected by the reflector plate 46 as shown in FIG. 12C and can enter the optical member 16E from the side of the light entering surface 44. The entering light can be reflected by the inner surface of the optical member 16E and projected toward the projection lens 14. The light passing through the projection lens 14 can be projected onto the second light distribution pattern Hc of the light distribution pattern HB as shown in FIG. 4. Accordingly, the light utilization efficiency of the light from the LED light source can be improved.

Figure 13:
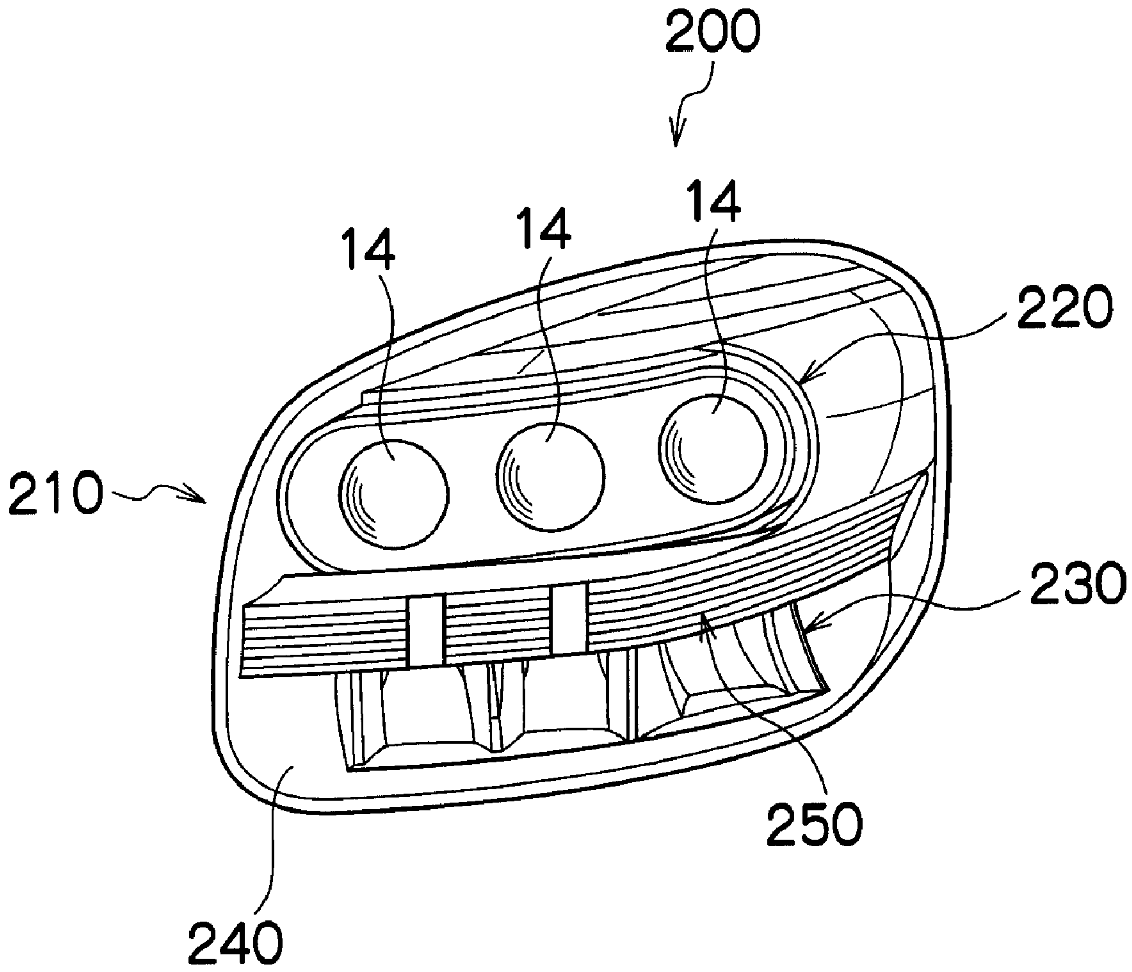
FIG. 13 is a perspective view of one exemplary embodiment of a vehicle headlight including vehicle headlight units installed therein according to the presently disclosed subject matter.

Any of the vehicle headlight units 10 to 10E as in the first to sixth exemplary embodiments can be applied for use in a vehicle headlight. FIG. 13 is a perspective view illustrating a vehicle headlight 200 made in accordance with principles of the presently disclosed subject matter. The vehicle headlight 200 can include a housing 210, a vehicle headlight unit portion 220, a reflector type headlight unit portion 230, an extension 240, a light guiding lens or portion 250, and the like. The vehicle headlight unit portion 220 can include three vehicle headlight units which are any of the types of the vehicle headlight units 10 to 10E of the first to sixth exemplary embodiments. The three vehicle headlight units can be disposed horizontally side by side. In FIG. 13, the respective projection lenses 14 of the units are illustrated. It should be appreciated that the configuration behind the projection lens 14 can be the same as any of the different types of the vehicle headlight units 10 to 10E of the first to sixth exemplary embodiments, and accordingly, drawings and descriptions thereof are omitted here.

Because the vehicle headlight units can have any of the configurations shown in the exemplary embodiments, and can provide the advantageous effects described above, the vehicle headlight 200 including these units can form a predetermined light distribution pattern with high brightness. As the vehicle headlight units can be configured to have a small dimension in the depth direction, the vehicle headlight 200 can also be configured to have a small dimension in the depth direction accordingly. This means that the dimension of the space required for installing the vehicle headlight 200 of the presently disclosed subject matter on a vehicle body can be reduced, thereby improving the degree of freedom for designing the entire vehicle body.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle lighting unit having an optical axis, comprising:

an LED light source having a light emitting portion and an LED optical axis substantially parallel with the optical axis of the vehicle lighting unit;

a projection lens disposed forward in a light emitting direction of the optical axis of the LED light source and having an optical axis substantially parallel with the LED optical axis of the LED light source; and an optical member disposed between the LED light source and the projection lens, the optical member being configured so as to transmit light received from the LED light source toward the projection lens to allow the light to pass through the projection lens and to form a predetermined light distribution pattern having a cut-off line, the optical member including a first reflecting surface horizontally disposed below the LED optical axis of the LED light source and substantially on the optical axis of the vehicle lighting unit, and a second reflecting surface disposed above the LED optical axis and facing towards the first reflecting surface, wherein the first reflecting surface includes an edge in a substantially elliptic shape arranged in a horizontal plane and configured to take an aberration of the projection lens into consideration, the first reflecting surface extending from the edge to a location adjacent the light emitting portion of the LED light source, and the second reflecting surface has a focus disposed substantially on the LED light source, and the second reflecting surface including at least one of a substantially conical curved surface and a curved surface having at least a part of a cross section of a substantially conical curved surface; and wherein the LED and projection lens are so configured such that at least a portion of light emitted from the LED is directly incident upon the projection lens without reflection.

2. The vehicle lighting unit according to claim 1, wherein the optical member further includes a third reflecting surface that is opposite to the first reflecting surface with the optical axis of the LED light source being interposed therebetween and the third reflecting surface being substantially parallel with the optical axis of the LED light source.

3. The vehicle lighting unit according to claim 1, wherein the first reflecting surface and the second reflecting surface of the optical member define a space surrounded thereby and the space is filled with a resin.

4. The vehicle lighting unit according to claim 3, wherein the first reflecting surface and the second reflecting surface of the optical member are at least partly covered with a reflection surface layer.

5. The vehicle lighting unit according to claim 2, wherein the first reflecting surface, the second reflecting surface, and the third reflecting surface of the optical member define a space surrounded thereby and the space is filled with a resin.

6. The vehicle lighting unit according to claim 5, wherein the first reflecting surface, the second reflecting surface, and the third reflecting surface of the optical member are at least partly covered with a reflection surface layer.

7. The vehicle lighting unit according to claim 1, wherein a distance between the edge of the first reflecting surface of the optical member and the light emitting portion of the LED light source is 10 mm or less and greater than 0 mm.

8. The vehicle lighting unit according to claim 2, wherein a distance between the edge of the first reflecting surface of the optical member and the light emitting portion of the LED light source is 10 mm or less and greater than 0 mm.

9. The vehicle lighting unit according to claim 3, wherein a distance between the edge of the first reflecting surface of the optical member and the light emitting portion of the LED light source is 10 mm or less and greater than 0 mm.

10. The vehicle lighting unit according to claim 4, wherein a distance between the edge of the first reflecting surface of the optical member and the light emitting portion of the LED light source is 10 mm or less and greater than 0 mm.

11. The vehicle lighting unit according to claim 5, wherein a distance between the edge of the first reflecting surface of the optical member and the light emitting portion of the LED light source is 10 mm or less and greater than 0 mm.

12. The vehicle lighting unit according to claim 6, wherein a distance between the edge of the first reflecting surface of the optical member and the light emitting portion of the LED light source is 10 mm or less and greater than 0 mm.

13. The vehicle lighting unit according to claim 3, wherein the optical member includes a hollow portion around the optical axis of the LED light source so that the hollow portion penetrates the optical member and the light emitted from the LED light source along the LED optical axis passes through the hollow portion and directly enters the projection lens, and the first reflecting surface is disposed below the hollow portion.

14. The vehicle lighting unit according to claim 4, wherein the optical member includes a hollow portion around the optical axis of the LED light source so that the hollow portion penetrates the optical member and the light emitted from the LED light source along the LED optical axis passes through the hollow portion and directly enters the projection lens, and the first reflecting surface is disposed below the hollow portion.

15. The vehicle lighting unit according to claim 5, wherein the optical member includes a hollow portion around the optical axis of the LED light source so that the hollow portion penetrates the optical member and the light emitted from the LED light source along the LED optical axis passes through the hollow portion and directly enters the projection lens, and the first reflecting surface is disposed below the hollow portion.

16. The vehicle lighting unit according to claim 6, wherein the optical member includes a hollow portion around the optical axis of the LED light source so that the hollow portion penetrates the optical member and the light emitted from the LED light source along the LED optical axis passes through the hollow portion and directly enters the projection lens, and the first reflecting surface is disposed below the hollow portion.

17. The vehicle lighting unit according to claim 3, wherein the optical member includes a light entering surface configured to receive light from the LED light source, the light entering surface being formed in a convex shape facing toward the LED light source.

18. The vehicle lighting unit according to claim 4, wherein the optical member includes a light entering surface configured to receive light from the LED light source, the light entering surface being formed in a convex shape facing toward the LED light source.

19. The vehicle lighting unit according to claim 5, wherein the optical member includes a light entering surface configured to receive light from the LED light source, the light entering surface being formed in a convex shape facing toward the LED light source.

20. The vehicle lighting unit according to claim 6, wherein the optical member includes a light entering surface configured to receive light from the LED light source, the light entering surface being formed in a convex shape facing toward the LED light source.

21. The vehicle lighting unit according to claim 1, wherein the light emitting portion of the LED light source has a lower side that is disposed such that the first reflecting surface prevents light emitted from the light emitting portion from entering below the first reflection surface.

22. The vehicle lighting unit according to claim 1, wherein the vehicle lighting unit is configured to project light to form the predetermined light distribution pattern including the cut-off line, and the first reflecting surface of the optical member includes a surface inclined by 15 to 45 degrees with respect to a horizontal width direction for forming the cut-off line near the optical axis of the vehicle lighting unit.

23. The vehicle lighting unit according to claim 2, wherein the light emitting portion of the LED light source has a lower side that is disposed such that the first reflecting surface prevents light emitted from the light emitting portion from entering below the first reflection surface.

24. The vehicle lighting unit according to claim 2, wherein the vehicle lighting unit is configured to project light to form the predetermined light distribution pattern including the cut-off line, and the first reflecting surface of the optical member includes a surface inclined by 15 to 45 degrees with respect to a horizontal width direction for forming the cut-off line near the optical axis of the vehicle lighting unit.

25. A vehicle light comprising:

a housing; and a vehicle lighting unit portion including at least one vehicle lighting unit according to claim 1.

26. A vehicle light comprising:

a housing; and a vehicle lighting unit portion including at least one vehicle lighting unit according to claim 2.

* * * * *